United States Patent
Sivaram et al.

(10) Patent No.: US 7,219,198 B2
(45) Date of Patent: May 15, 2007

(54) FACILITATING COMMUNICATION WITHIN SHARED MEMORY ENVIRONMENTS USING LOCK-FREE QUEUES

(75) Inventors: Rajeev Sivaram, West Orange, NJ (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/874,024

(22) Filed: Jun. 22, 2004

(65) Prior Publication Data

US 2005/0283577 A1 Dec. 22, 2005

(51) Int. Cl.
*G06F 12/14* (2006.01)

(52) U.S. Cl. .................................... 711/150
(58) Field of Classification Search ............... 711/147, 711/150, 168; 719/314
See application file for complete search history.

(56) References Cited

U.S. PATENT DOCUMENTS

| | | | |
|---|---|---|---|
| 5,938,765 A | 8/1999 | Dove et al. ............... | 713/1 |
| 6,029,205 A | 2/2000 | Alferness et al. .......... | 709/300 |
| 6,182,152 B1 | 1/2001 | Jonkers .................... | 709/310 |
| 6,629,152 B2 | 9/2003 | Kingsbury et al. ......... | 709/313 |
| 2002/0059165 A1* | 5/2002 | Hersh et al. .............. | 707/1 |
| 2003/0061395 A1 | 3/2003 | Kingsbury et al. ......... | 709/312 |
| 2003/0182465 A1* | 9/2003 | Moir et al. ............... | 709/314 |

OTHER PUBLICATIONS

Valois, "Implementing Lock-Free Queues", 1994, Proceedings of the Seventh International Conference on Parallel and Distributed Systems, p. 1-9.*

"Integration of Message Passing and Shared Memory in the Stanford FLASH Multiprocessor," J. Heinlein, K. Gharachorloo, S. Dresser, A Gupta; Computer System Laboratory, Stanford University; pp. 38-50.

"Program Transformation and Runtime Support for Threaded MPI Execution on Shared-Memory Machines," H. Tang, K. Shen, T. Yang; ACM Transactions on Programming Languages and Systems, vol. 22, No. 4, Jul. 2000; pp. 673-682.

"Compile/Run-Time Support for Threaded MPI Execution on Multiprogrammed Shared Memory Machines," H. Tang, K. Shen, T. Yang; SIGPLAN Notices, vol. 34, No. 8, pp. 107-118, Aug. 1999 (abstract only).

"Managing Concurrent Access for Shared Memory Active Messages," SS. Lumetta, DE Culler; Proceedings of the First Merged International Parallel Processing Symposium and Symposium on Parallel and Distributed Processing (Cat. No. 98TB100227), pp. 272-278, 1998 (abstract only).

"Lock-Free Queue Management Scheme for Communication Between Two Processors," P. Capek, W. Chiu, W. Frazer; IBM Technical Disclosure Bulletin, vol. 23, No. 7A, pp. 3059-3061, Dec. 1980 (abstract only).

* cited by examiner

*Primary Examiner*—Kevin L. Ellis
(74) *Attorney, Agent, or Firm*—Lawrence D. Cutter, Esq.; Blanche E. Schiller, Esq.; Heslin Rothenberg Farley & Mesiti, P.C.

(57) ABSTRACT

Lock-free queues of a shared memory environment are used to facilitate communication within that environment. The lock-free queues can be used for interprocess communication, as well as intraprocess communication. The lock-free queues are structured to minimize the use of atomic operations when performing operations on the queues, and to minimize the number of enqueue/dequeue operations to be performed on the queues.

63 Claims, 5 Drawing Sheets

FACILITATING COMMUNICATION WITHIN SHARED MEMORY ENVIRONMENTS USING LOCK-FREE QUEUES

TECHNICAL FIELD

This invention relates, in general, to communication within a shared memory environment, and more particularly, to using lock-free queues to communicate within the environment, the lock-free queues being structured to improve efficiency in communications.

BACKGROUND OF THE INVENTION

Shared memory has long been used for communication, such as interprocess communication, in environments having shared memory. The memory is accessible by a plurality of processes and those processes use queues resident within the shared memory for communication. For example, each process has at least one queue to be used for communication and other processes access a particular process' queue to communicate with that process. Since multiple processes access the same queue, locking mechanisms are used to protect the integrity of the queue. Lock protection, however, causes contention for the queues, which is costly in terms of performance.

To improve performance, it is possible to have dedicated queues in which each process that wishes to communicate with another process has a dedicated queue for that other process. However, this dramatically increases the number of queues needed and reduces scalability within the environment.

Based on the foregoing, a need still exists for a more efficient mechanism for using shared memory for communication. For example, a need exists for an improved capability that eliminates locking, while not dramatically increasing the number of queues needed for communication.

SUMMARY OF THE INVENTION

The shortcomings of the prior art are overcome and additional advantages are provided through the provision of a method of facilitating communication within a shared memory environment. The method includes, for instance, employing, by a processing entity of the shared memory environment, a lock-free queue of the shared memory environment for use in communication, the lock-free queue being concurrently accessible at one end of the lock-free queue for writing to the lock-free queue by a plurality of processing entities of the shared memory environment, being non-concurrently accessible at another end of the lock-free queue, and sized to not reach a full condition.

In another aspect, a method of processing queues of a shared memory environment is provided. The method includes, for instance, enqueuing a message on a lock-free queue of the shared memory environment using a single atomic operation, the lock-free queue capable of being written to by a plurality of processing entities.

In yet another aspect of the present invention, a method of processing queues of a shared memory environment is provided. The method includes, for instance, dequeuing a message from a lock-free queue of the shared memory environment absent an atomic operation, the lock-free queue capable of being written to by a plurality of processing entities.

As yet a further aspect of the present invention, a shared memory including a queue is provided, in which the queue includes, for instance, a first end of the queue, the first end being concurrently accessible by a plurality of processing entities; a second end of the queue, the second end being non-concurrently accessible by a plurality of processing entities; and wherein the queue is lock-free and sized to not reach a full condition.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, lock-free queues of a shared memory environment are used to facilitate communication within that environment. As one example, lock-free queues are used to facilitate communication between processing entities of the environment that have access to the shared memory. In one scenario, the processing entities are processes or tasks, and one or more lock-free queues are used to communicate between different processes or tasks. In another scenario, the processing entities are threads of one process, and one or more lock-free queues are used to communicate between different threads of one process. The lock-free queues are structured to minimize the use of atomic operations and the number of enqueue/dequeue operations needed to be performed on the queues.

Figure 1:
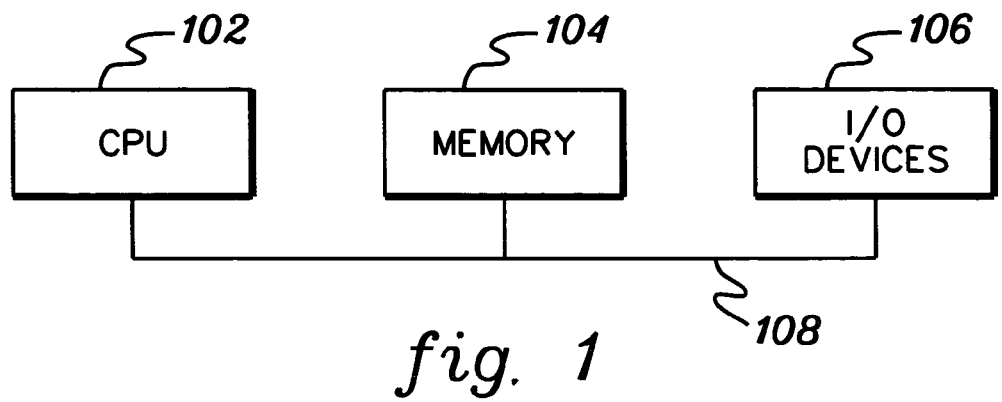
FIG. 1 depicts one embodiment of a shared memory environment incorporating and using one or more aspects of the present invention.

One embodiment of a shared memory environment incorporating and using one or more aspects of the present invention is described with reference to FIG. 1. A shared memory environment 100 includes, for instance, a central processing unit 102 executing an operating system, such as AIX offered by International Business Machines Corporation, Armonk, N.Y.; a shared memory 104 (e.g., main memory, a memory region, etc.); and one or more input/output (I/O) devices 106 coupled to one another via, for example, one or more buses 108. As one example, shared memory environment 100 includes an RS/6000 computing unit offered by International Business Machines Corporation, Armonk, N.Y.

Figure 2:
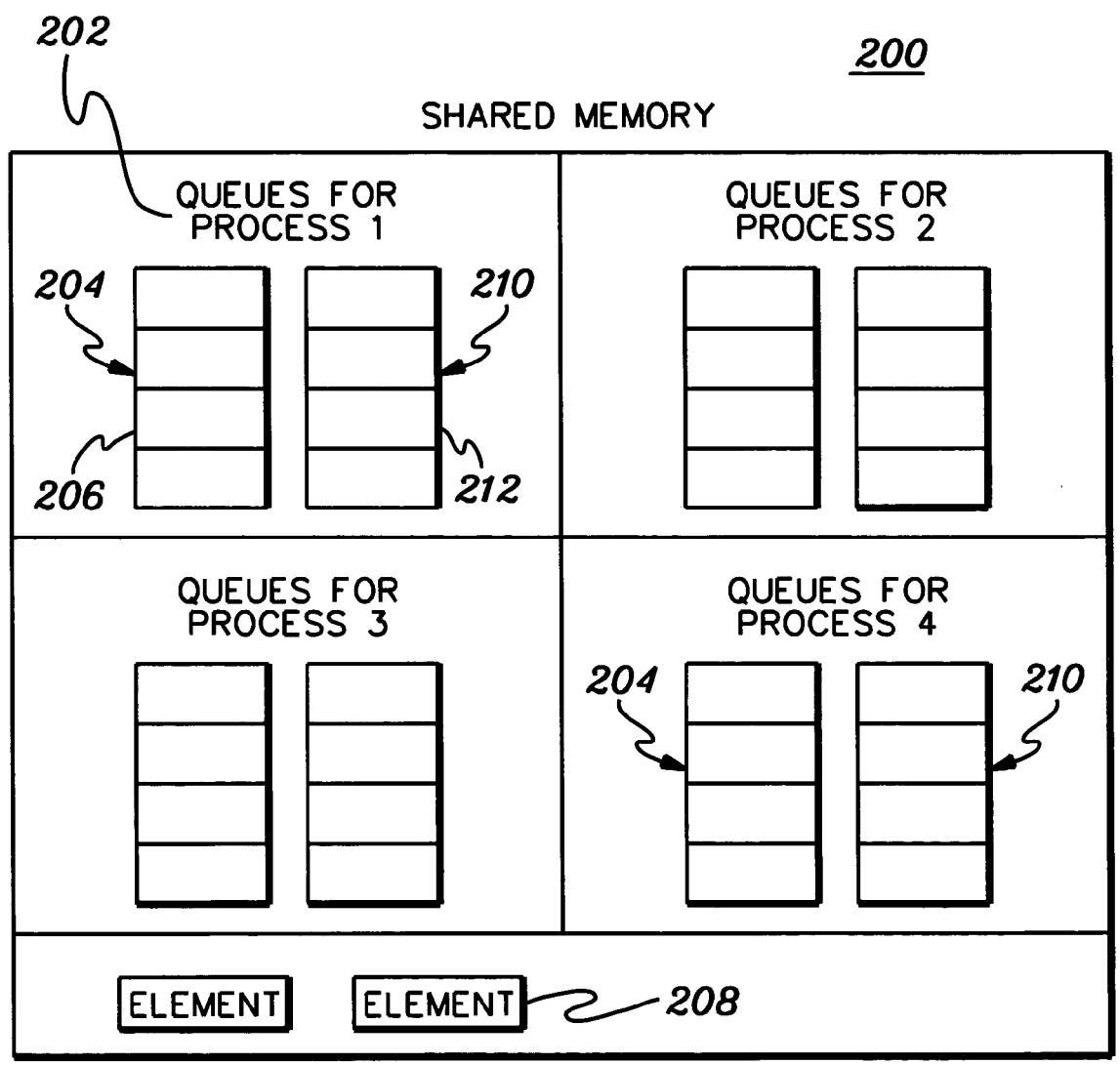
FIG. 2 depicts one example of a shared memory of the environment of FIG. 1, in accordance with an aspect of the present invention.

The shared memory environment has executing therein a plurality of processing entities that have access to shared memory. In the examples described herein, the processing entities are processes; however, in other embodiments, the processing entities are threads of a process or other types of entities. The processing entities communicate via the shared memory, as described in further detail with reference to FIG. 2.

In one example, a shared memory 200 is accessible by a plurality of processes 202. The processes use the shared memory to communicate with one another. In particular, the processes use queues resident within the shared memory for communication. For instance, each process 202 has associated therewith a data queue 204 that is used to receive data from other processes. Each data queue 204 has zero or more entries 206, and each entry 206 includes an indicator (e.g., index, pointer, locator, etc.) of an element 208 in shared memory. The element includes data (e.g., information, a message, etc.) that is to be communicated between processes or other processing entities. In another embodiment, the indicator of the element is the element itself.

An element is enqueued on a receiving process' data queue when a sending process wishes to forward data to a receiving process, and an element is dequeued when a receiving process wishes to access the data. In the examples described herein, an element is enqueued by placing an indicator of the element on the queue, and an element is dequeued by retrieving an indicator from the queue. In other embodiments, the enqueuing/dequeuing includes placing/retrieving the element itself.

Elements that are available for storing data are tracked by another queue, referred to as a free queue 210. Each process has an associated free queue. Similar to the data queue, the free queue includes zero or more entries 212, and each entry includes an indicator of an available element.

The queues used for communication are lock-free queues, and thus, in order to handle concurrent operations on the queues, atomic operations are employed. In this embodiment, both the data and free queues are lock-free queues. However, in other embodiments, the free queues can be lock-protected queues or a data structure other than a queue. Atomic operations are faster than locks, which increases the performance of the lock-free queues over lock-protected queues. The use of atomic operations is minimized, however, in accordance with an aspect of the present invention. For instance, concurrency is provided for enqueue operations, but not for dequeue operations, and as such, atomic operations are only needed for enqueue operations, and not for dequeue operations. Concurrency for enqueue operations enables a plurality of processes to concurrently write to the queue. Non-concurrency for dequeue operations is acceptable, since a queue is owned by one process and only the owner is to process the data of the queue. Further, the use of atomic operations for enqueue operations is minimized by enabling an enqueue operation to be performed via a single atomic operation.

Prior to enqueueing/dequeuing elements on a data queue, the queue is initialized. For instance, int queue [size] is used to initialize the queue. The size of the queue is a power of 2 and it is sufficiently large such that the queue does not become full. This is accomplished by providing a queue size that is the same as the total number of elements available to the processes. For example, if there are 64 processes and each process can submit up to 128 on-the-fly elements, a queue of size 64×128=8192 is sufficient.

Queues and enqueue and dequeue operations can be employed in many situations and environments, including, but not limited to, intraprocess communications and interprocess communications. In the example described herein, the queues and associated operations are being employed in interprocess communication, also known as message passing. Thus, the data queue is referred to as a message queue. Also, the elements in memory are referred to as slots.

Figure 3:
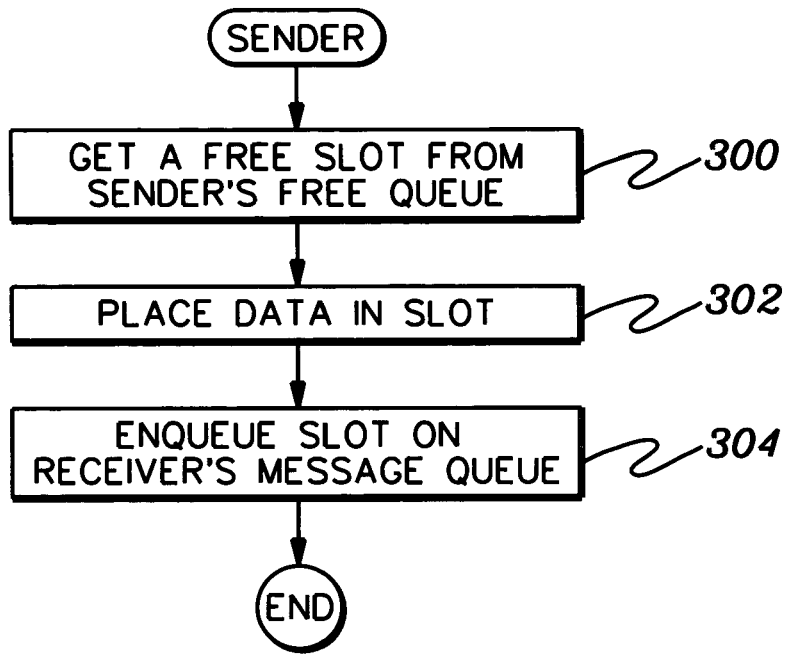
FIG. 3 depicts one embodiment of the logic associated with a sender forwarding a message to a receiver, in accordance with an aspect of the present invention.

One embodiment of the logic associated with a process sending a message to another process is described with reference to FIG. 3. Initially, a sender (e.g., a process) wishing to communicate with a receiver (e.g., another process) obtains a free slot from the sender's free queue, STEP 300. For example, a dequeue operation, described below, is used to retrieve from the free queue an indicator of an available slot (e.g., element) in shared memory capable of holding data to be sent to the receiver. In response to receiving the indicator, the sender places data, such as a message, in the slot identified by the indicator obtained from the free queue, STEP 302. The slot is then enqueued on the receiver's message queue, STEP 304. That is, the indicator of the slot is placed in the receiver's message queue, as described below.

Figure 4:
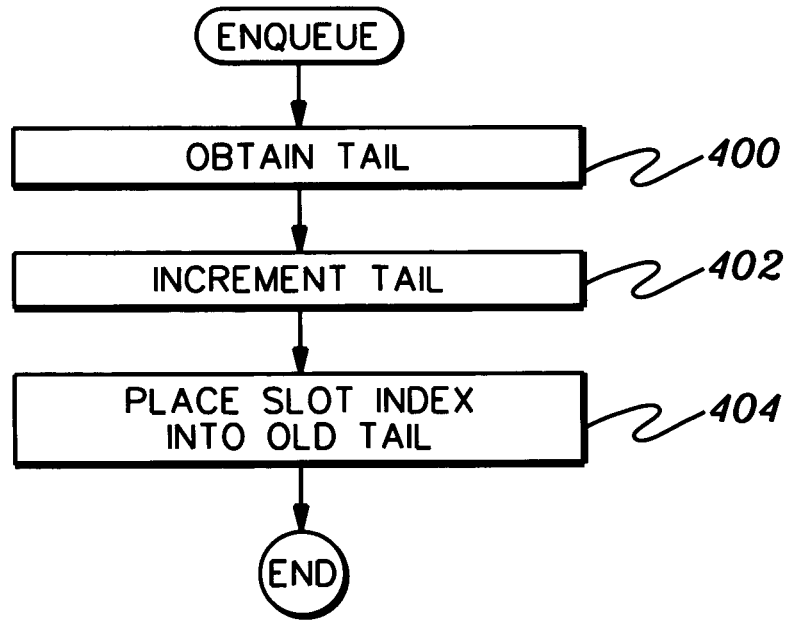
FIG. 4 depicts one embodiment of the logic associated with enqueuing an element on a queue, in accordance with an aspect of the present invention.
Figure 5A:
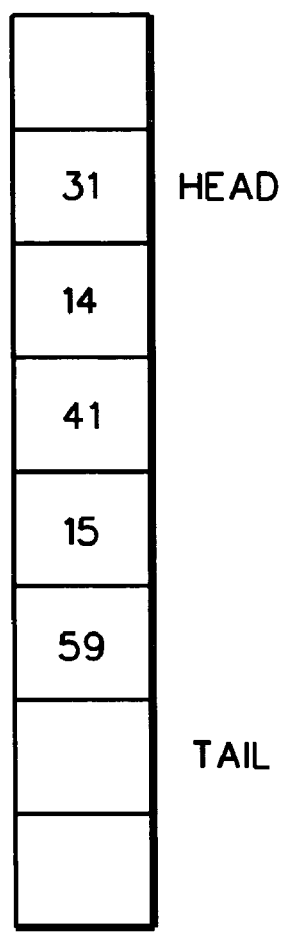
FIGS. 5a–5b depict an example of a queue being processed in accordance with aspects of the present invention.
Figure 5B:
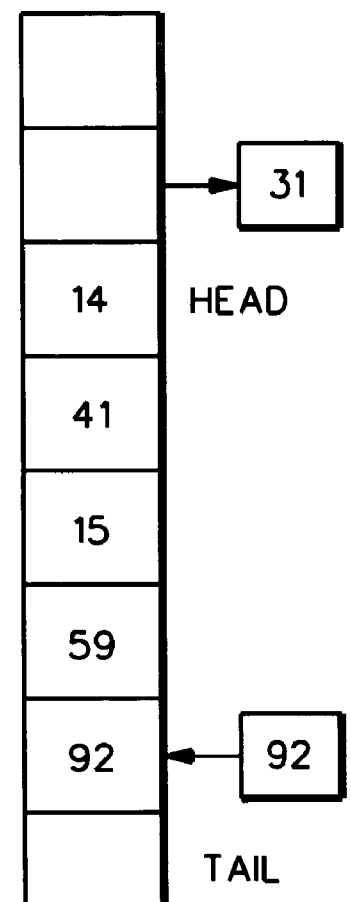

To enqueue the slot on the receiver's message queue, various steps are performed, as described with reference to FIG. 4. Initially, a determination is made as to the value of the current tail of the message queue, STEP 400. That value is then incremented to provide a new tail, STEP 402. (The enqueue operation does not check for a full queue, since the queue is designed not to be full.) As one example, the determination and updating of the tail value is performed via an atomic operation. The atomic operation is, in this implementation, a fetch_and_add operation; however, in other embodiments, other atomic operations may be used, such a compare_and_swap, test_and_set, etc. In pseudocode, the fetch_and_add operation is defined as: word fetch_and_add (word *var, word inc), which atomically increments the word value stored in var by inc and returns the original value before the increment. The fetch_and_add is used, in one example, as follows: old_tail=fetch_and_add (tail,1) % size, in which % size refers to modulo arithmetic. Thus, using the example of the queue depicted in FIG. 5a, which has a size of 8 entries ranging from 0 to 7, the obtained value of the tail is 6, and the value of the new tail, shown in FIG. 5b, is 7.

Returning to FIG. 4, next, the indicator of the slot holding the data to be provided to the receiver is placed into the old tail. For example, a 92 is placed at the old tail as shown in FIG. 5b.

Figure 6:
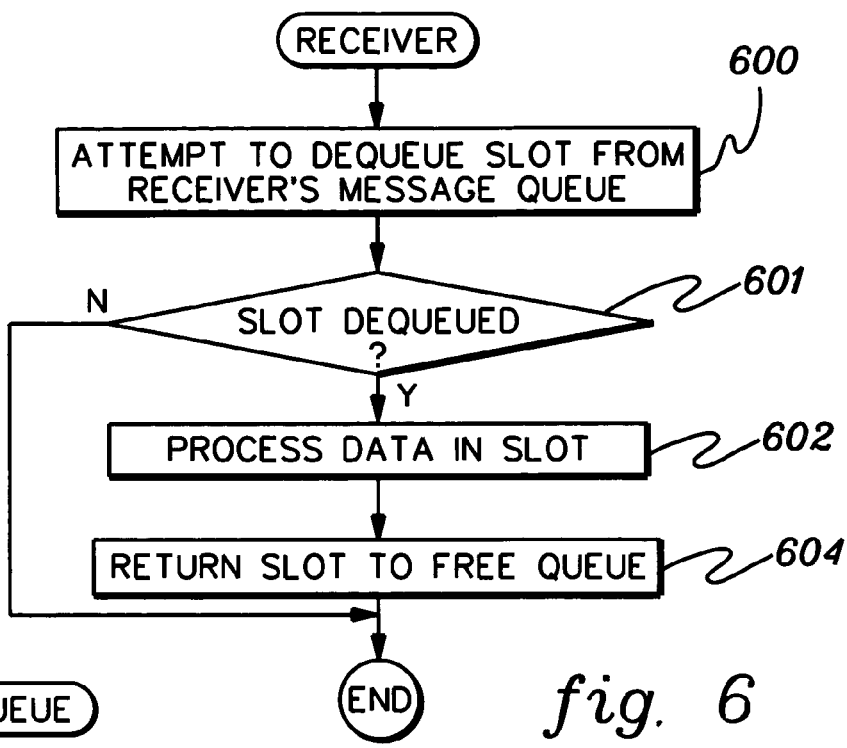
FIG. 6 depicts one embodiment of the logic associated with a receiver receiving a message from a sender, in accordance with an aspect of the present invention.
Figure 7:
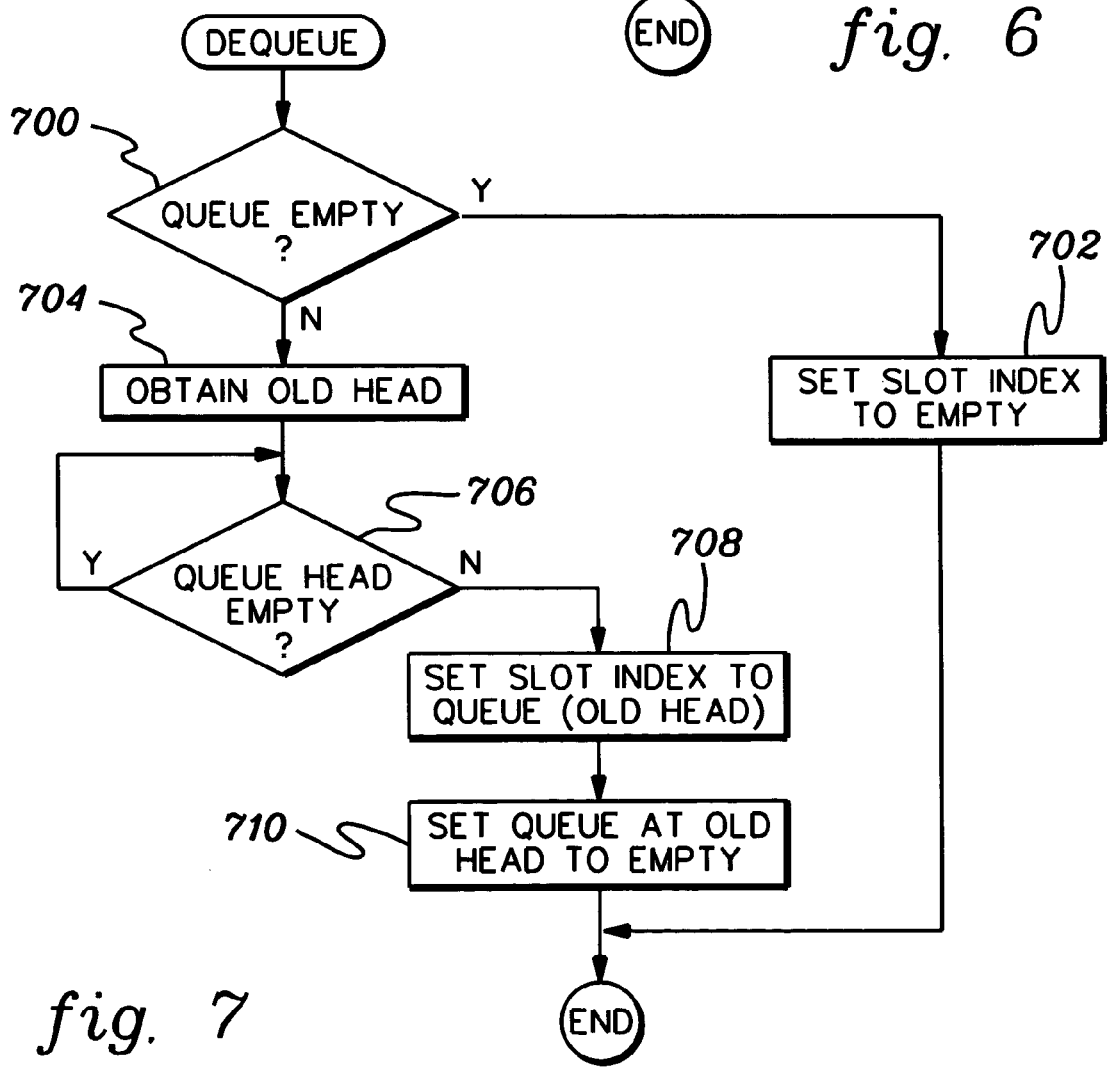
FIG. 7 depicts one embodiment of the logic associated with dequeuing an element from a queue, in accordance with an aspect of the present invention.

Periodically, the receiver checks its queue to determine if there are any messages. One example of this processing is described with reference to FIG. 6. Initially, the receiver attempts to dequeue a slot from the receiver's message queue, STEP 600. One example of the dequeue operation is described with reference to FIG. 7.

A determination is made as to whether the queue is empty, STEP 700. If the queue is empty, then a variable, referred to as slot_index, is set to empty indicating that there are no slots on the message queue, STEP 702, and dequeue processing concludes. However, if the queue is not empty, then a value of the head of the queue is obtained, STEP 704. As one example, the following pseudocode may be used: old_head=head ++% size, in which modulo arithmetic is used to determine the value of the head. Thus, with reference to FIG. 5*a*, old_head=1, in this example.

Thereafter, a while loop is performed to ensure that processing does not continue while the head of the queue is empty. This condition may occur, since the tail pointer is updated in an enqueue operation before the slot indicator is put into the queue. Thus, a determination is made as to whether the queue head is empty, INQUIRY 706. If yes, then processing returns to that inquiry. However, if the queue head is not empty, then the variable, slot_index, is set to queue [old_head], STEP 708. Slot_index now includes the indicator of the slot that has the data to be retrieved. Additionally, the queue at old head (e.g., queue [old_head]) is set to empty, STEP 710. Thus, as shown in FIG. 5*b*, the indicator at queue entry one, which was the head, is dequeued providing an indicator of 31, and the queue at that position is now empty. The value of head is incremented to indicate the new head.

Returning to FIG. 6, subsequent to attempting to dequeue a slot from the receiver's message queue, a determination is made as to whether a slot was dequeued, INQUIRY 601. If an indicator of a slot was not returned by the dequeue process, then processing is complete. However, if an indicator was returned, then the data in the slot specified by the indicator is processed, STEP 602, and the slot is returned to the free queue, STEP 604. In one example, an enqueue operation is used to return the slot to the free queue.

In the above example, the receiver periodically checks for messages. However, in another embodiment, the receiver receives an indication that there is a message. In that case, some of the above logic relating to testing the queue may optionally be eliminated. Other embodiments are also possible.

In a further aspect of the present invention, to reduce the number of enqueue and dequeue operations, the slot used by the last incoming message is not returned to the free slot queue immediately. Instead, the slot is saved for the next outgoing message. That is, an indicator of the slot is saved, as one example. For instance, in communications protocols, it is common for the receiver to send a message back to the sender in reply to the message just received, so slot reuse saves one enqueue and one dequeue operation. One embodiment of the logic associated with passing a message when slots of incoming messages are reused for outgoing messages is described with reference to FIGS. 8 and 9. In particular, FIG. 8 describes one embodiment of the logic associated with the sender reusing a slot, and FIG. 9 depicts one embodiment of the logic associated with a receiver saving a slot for reuse.

Figure 8:
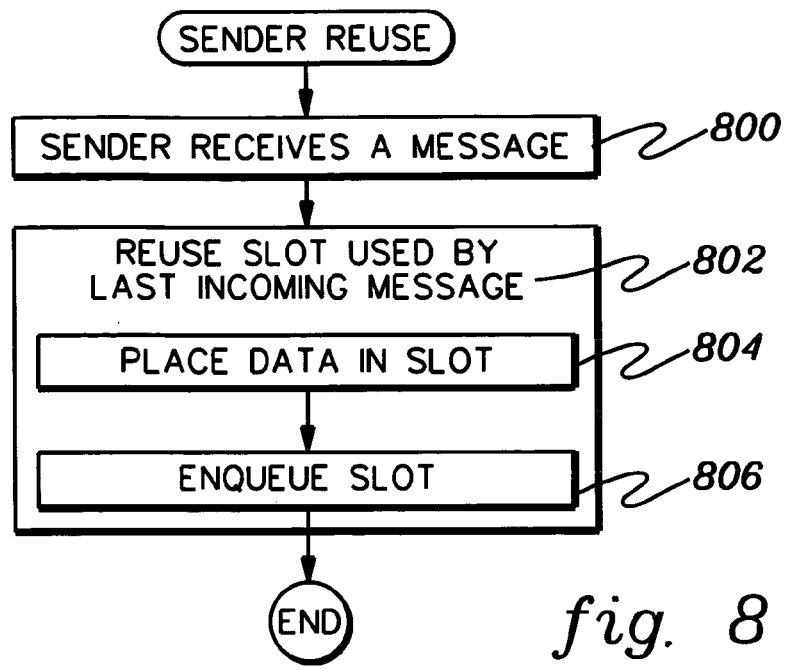
FIG. 8 depicts one embodiment of the logic associated with a sender reusing a queue slot to communicate with a receiver, in accordance with an aspect of the present invention.
Figure 9:
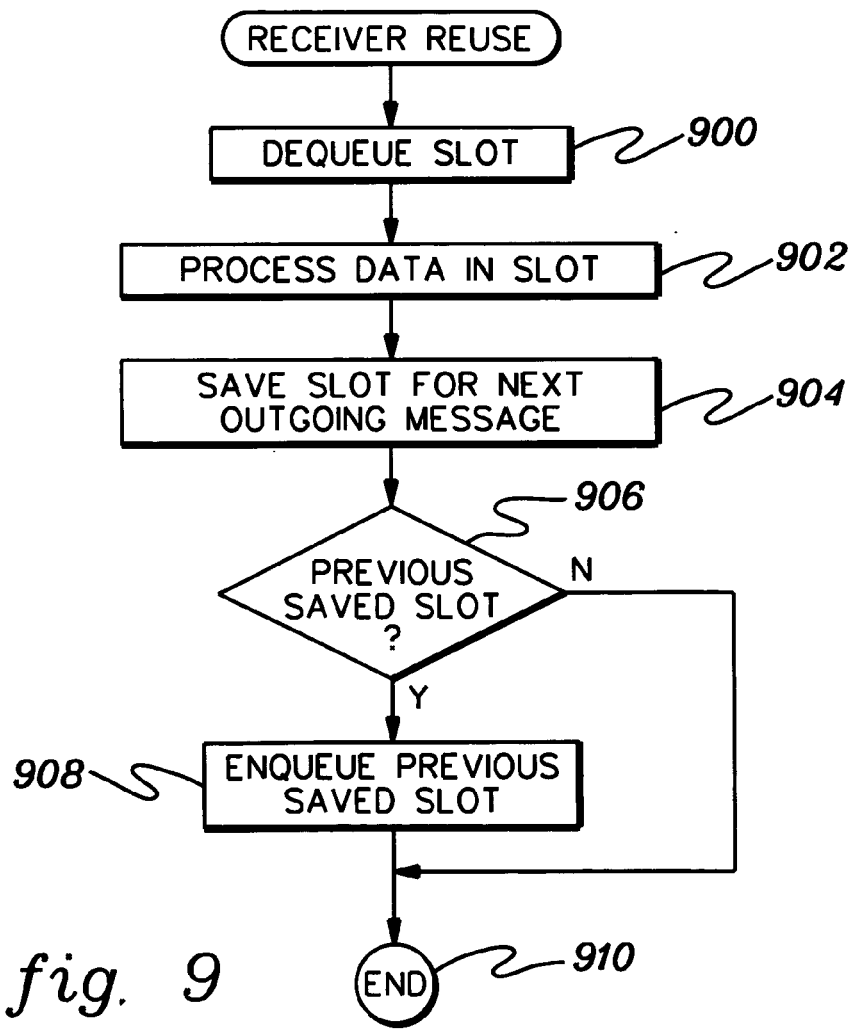
FIG. 9 depicts one embodiment of the logic associated with a receiver reusing a slot, in accordance with an aspect of the present invention.

With reference to FIG. 8, a sender receives a message for which a reply is to be sent, STEP 800. For efficiency, the sender reuses the slot used by the last incoming message, STEP 802. In particular, the sender places data in that slot, which is identified by the saved slot indicator, STEP 804, and enqueues the slot on the receiver's queue, as described above, STEP 806.

The receiver dequeues a slot from its queue, STEP 900, and processes the data in the slot, STEP 902. The slot is then saved for the next outgoing message, STEP 904. For instance, an indicator of the slot is saved.

In one embodiment, if multiple messages are received by one process, then only the slot used by the last message is saved for reuse. The other slots that are not going to be reused are returned to the free slot queue. Thus, a determination is made as to whether there is a previous saved slot, INQUIRY 906. If so, then the previous saved slot is enqueued on the free queue, as described above, STEP 908. Thereafter, or if there is no previous saved slot, then processing is complete, STEP 910.

In one embodiment, each process holds up to one outstanding slot that is not in either its message queue or its free slot queue. As long as the number of free slots owned by a process is greater than a total number of processes, there is no starvation in which a process cannot get a free slot to submit a message. This is because the total number of outstanding slots can be for one process at most the total number of processing entities communicating in the shared memory, and the rest of the slots are returned to the free slot queue of the process sooner or later.

Described in detail above is a capability for facilitating communication within a shared memory environment. To facilitate communication, lock-free queues are provided that minimize atomic operations, as well as enqueue/dequeue operations. The queues have the characteristics of not becoming full and only having concurrency at one end, e.g., the tails for enqueue operations. By using these queues, latency is low and performance is enhanced.

Performance is also enhanced by reusing queue elements, thus minimizing the number of enqueue/dequeue operations.

Although various examples are described above, these are only examples. Many variations may be provided without departing from the spirit of the present invention. For example, although an environment is provided above, other types of environments may benefit from one or more aspects of the present invention. For example, many environments having shared memory can benefit from one or more aspects of the present invention, including, but not limited to, communications environments, such as computing environments, as well as other types of communications environments. As a further example, computing units other than RS/6000s or operating systems other than AIX may be used. Further, processing entities other than processes or tasks or threads within a process may benefit from one or more aspects of the present invention.

The queues described herein may be used for other than communication. Further, although in the embodiments described herein, indicators are placed in the queues, in other embodiments, data or messages may be placed in the queues, as well as other and/or additional information. These and many other variations may be included in other embodiments of the present invention.

Moreover, although in the examples described herein, the size of the queue is a power of 2 and modulo arithmetic is used to find the head, in other embodiments, the size can be other than a power of 2 and/or modulo arithmetic may not be used. The size can be any value, but it is not to reach a full condition (i.e., an entry is always available in the queue for an enqueue operation).

Further, although in the slot reuse examples described above, the slot of the last incoming message is saved, in other examples, it may be slots of other messages and/or more than one slot may be saved. Other variations are also possible.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating communication within a shared memory environment, said method comprising:
   employing, by a processing entity of the shared memory environment, a lock-free queue of the shared memory environment for use in communication, said lock-free queue being concurrently accessible at one end of the lock-free queue for writing to the lock-free queue by a plurality of processing entities of the shared memory environment, being non-concurrently accessible at another end of the lock-free queue, and being sized to not reach a full condition.

2. The method of claim 1, wherein the processing entity comprises a process, and the plurality of processing entities comprise a plurality of processes.

3. The method of claim 1, wherein the processing entity comprises a thread of a process, and the plurality of processing entities comprise a plurality of threads of the process.

4. The method of claim 1, wherein the employing comprises enqueuing an element on the lock-free queue using a single atomic operation only once.

5. The method of claim 4, wherein the enqueuing comprises:
   determining an identifier of a tail of the lock-free queue;
   incrementing the identifier of the tail to identify a new tail; and
   storing at the tail identified by the identifier prior to being incremented an indicator associated with the element.

6. The method of claim 5, wherein the element indicated by the indicator stored at the tail is located in shared memory.

7. The method of claim 5, wherein the determining and the incrementing are performed by the single atomic operation.

8. The method of claim 7, wherein the single atomic operation comprises a fetch and add operation.

9. The method of claim 1, wherein the employing comprising dequeuing an element of the lock-free queue absent an atomic operation.

10. The method of claim 9, wherein the dequeuing comprises:
    determining an identifier of a head of the lock-free queue; and
    retrieving from the head identified by the identifier an indicator associated with the element.

11. The method of claim 10, wherein the dequeuing further comprises incrementing the identifier of the head to identify a new head.

12. The method of claim 10, wherein the element indicated by the indicator retrieved from the head is located in shared memory.

13. The method of claim 10, further comprising:
    checking whether the lock-free queue is empty; and
    proceeding with the determining the identifier, in response to the checking indicating a non-empty lock-free queue.

14. The method of claim 10, further comprising:
    checking whether the lock-free queue at the head identified by the identifier is empty; and
    waiting until the head is not empty before proceeding to the retrieving of the indicator.

15. The method of claim 1, wherein the one end is at a tail of the lock-free queue and the another end is at a head of the lock-free queue.

16. The method of claim 1, wherein the employing comprises:
    obtaining an indicator of a slot in shared memory to place data;
    storing data in the slot specified by the indicator; and
    providing the indicator to the lock-free queue to enable access to the data stored in the slot.

17. The method of claim 16, wherein the slot is a slot used by an incoming message to the processing entity.

18. The method of claim 17, wherein the incoming message is a last received message by the processing entity.

19. The method of claim 16, wherein the indicator is obtained from a free slot data structure.

20. The method of claim 16, wherein the providing the indicator comprises:
    atomically determining employing a single fetch and add operation an identifier of a tail of the lock-free queue and incrementing the identifier of the tail to identify a new tail; and
    storing at the tail identified by the identifier prior to being incremented the indicator of the slot.

21. The method of claim 1, wherein the employing comprises:
    obtaining from the lock-free queue an indicator of a slot in shared memory storing data to be processed; and
    processing data of the slot identified by the indicator.

22. The method of claim 21, wherein the obtaining comprises:
    determining an identifier of a head of the lock-free queue; and
    retrieving from the head identified by the identifier the indicator of the slot.

23. The method of claim 21, further comprising saving the slot for an outgoing message.

24. The method of claim 23, further comprising:
    determining whether another slot is saved; and
    returning the another slot to a free slot data structure, in response to the determining indicating the another slot is saved.

25. The method of claim 21, further comprising returning the slot to a free slot data structure.

26. A method of processing queues of a shared memory environment, said method comprising:
enqueuing a message on a lock-free queue of the shared memory environment using a single atomic operation only once, the lock-free queue capable of being written to by a plurality of processing entities.

27. A method of processing queues of a shared memory environment, said method comprising:
dequeuing a message from a lock-free queue of the shared memory environment absent an atomic operation, the lock-free queue capable of being written to by a plurality of processing entities.

28. A shared memory comprising:
a queue, said queue comprising:
a first end of the queue, said first end being concurrently accessible by a plurality of processing entities;
a second end of the queue, said second end being non-concurrently accessible by a plurality of processing entities; and
wherein said queue is lock-free and sized to not reach a full condition.

29. A system of facilitating communication within a shared memory environment, said system comprising:
a lock-free queue of the shared memory environment for use in communication, said lock-free queue being concurrently accessible at one end of the lock-free queue for writing to the lock-free queue by a plurality of processing entities of the shared memory environment, being non-concurrently accessible at another end of the lock-free queue, and sized to not reach a still condition; and
means for employing, by a processing entity of the shared memory environment, the lock-free queue.

30. The system of claim 29, wherein the means for employing comprises means for enqueuing an element on the lock-free queue using a single atomic operation only once.

31. The system of claim 30, wherein the means for enqueuing comprises:
means for determining an identifier of a tail of the lock-free queue;
means for incrementing the identifier of the tail to identify a new tail; and
means for storing at the tail identified by the identifier prior to being incremented an indicator associated with the element.

32. The system of claim 31, wherein the means for determining and the means for incrementing are performed by the single atomic operation.

33. The system of claim 29, wherein the means for employing comprising means for dequeuing an element of the lock-free queue absent an atomic operation.

34. The system of claim 33, wherein the means for dequeuing comprises:
means for determining an identifier of a head of the lock-free queue; and
means for retrieving from the head identified by the identifier an indicator associated with the element.

35. The system of claim 34, further comprising:
means for checking whether the lock-free queue is empty; and
means for proceeding with the determining the identifier, in response to the checking indicating a non-empty lock-free queue.

36. The system of claim 34, further comprising:
means for checking whether the lock-free queue at the head identified by the identifier is empty; and
means for waiting until the head is not empty before proceeding to the retrieving of the indicator.

37. The system of claim 29, wherein the means for employing comprises:
means for obtaining an indicator of a slot in shared memory to place data;
means for storing data in the slot specified by the indicator; and
means for providing the indicator to the lock-free queue to enable access to the data stored in the slot.

38. The system of claim 37, wherein the slot is a slot used by an incoming message to the processing entity.

39. The system of claim 38, wherein the incoming message is a last received message by the processing entity.

40. The system of claim 37, wherein the indicator is obtained from a free slot data structure.

41. The system of claim 37, wherein the means for providing the indicator comprises:
means for atomically determining employing a single fetch_and_add operation an identifier of a tail of the lock-free queue and means for incrementing the identifier of the tail to identity a new tail; and
means for storing at the tail identified by the identifier prior to being incremented the indicator of the slot.

42. The system of claim 29, wherein the means for employing comprises:
means for obtaining from the lock-free queue an indicator of a slot in shared memory storing data to be processed; and
means for processing data of the slot identified by the indicator.

43. The system of claim 42, wherein the means for obtaining comprises:
means for determining an identifier of a head of the lock-free queue; and
means for retrieving from the head identified by the identifier the indicator of the slot.

44. The system of claim 42, further comprising means for saving the slot for an outgoing message.

45. The system of claim 44, further comprising:
means for determining whether another slot is saved; and
means for returning the another slot to a free slot data structure, in response to the determining indicating the another slot is saved.

46. A system of facilitating communication within a shared memory environment, said system comprising:
a processing entity of the shared memory environment to employ a lock-free queue of the shared memory environment for use in communication, said lock-free queue being concurrently accessible at one end of the lock-free queue for writing to the lock-free queue by a plurality of processing entities of the shared memory environment, being non-concurrently accessible at another end of the lock-free queue, and sized to not reach a full condition.

47. An article of manufacture comprising:
at least one computer usable medium having computer readable program code logic to manage facilitating communication within a shared memory environment, the computer readable program code logic comprising:
employ logic to employ, by a processing entity of the shared memory environment, a lock-free queue of the shared memory environment for use in communication, said lock-free queue being concurrently accessible at one end of the lock-free queue for writing to the lock-free queue by a plurality of processing entities of the shared memory environment, being non-concurrently accessible at another end of the lock-free queue, and sized to not reach a full condition.

48. The article of manufacture of claim 47, wherein the employ logic comprises enqueue logic to enqueue an element on the lock-free queue using a single atomic operation only once.

49. The article of manufacture of claim 48, wherein the enqueue logic comprises:
    determine logic to determine an identifier of a tail of the lock-free queue;
    increment logic to increment the identifier of the tail to identify a new tail; and
    store logic to store at the tail identified by the identifier prior to being incremented an indicator associated with the element.

50. The article of manufacture of claim 49, wherein the determining and the incrementing are performed by the single atomic operation.

51. The article of manufacture of claim 47, wherein the employ logic comprises dequeue logic to dequeue an element of the lock-free queue absent an atomic operation.

52. The article of manufacture of claim 51, wherein the dequeue logic comprises:
    determine logic to determine an identifier of a head of the lock-free queue; and
    retrieve logic to retrieve from the head identified by the identifier an indicator associated with the element.

53. The article of manufacture of claim 52, further comprising:
    check logic to check whether the lock-free queue is empty; and
    proceed logic to proceed with the determining the identifier, in response to the checking indicating a non-empty lock-free queue.

54. The article of manufacture of claim 52, further comprising:
    check logic to check whether the lock-free queue at the head identified by the identifier is empty; and
    wait logic to wait until the head is not empty before proceeding to the retrieving of the indicator.

55. The article of manufacture of claim 47, wherein the employ logic comprises:
    obtain logic to obtain an indicator of a slot in shared memory to place data;
    store logic to store data in the slot specified by the indicator; and
    provide logic to provide the indicator to the lock-free queue to enable access to the data stored in the slot.

56. The article of manufacture of claim 55, wherein the slot is a slot used by an incoming message to the processing entity.

57. The article of manufacture of claim 56, wherein the incoming message is a last received message by the processing entity.

58. The article of manufacture of claim 55, wherein the indicator is obtained from a free slot data structure.

59. The article of manufacture of claim 55, wherein the provide logic comprises:
    logic to atomically determine employing a single fetch_and_add an identifier of a tail of the lock-free queue and to increment the identifier of the tail to identify a new tail; and
    store logic to store at the tail identified by the identifier prior to being incremented the indicator of the slot.

60. The article of manufacture of claim 47, wherein the employ logic comprises:
    obtain logic to obtain from the lock-free queue an indicator of a slot in shared memory storing data to be processed; and
    process logic to process data of the slot identified by the indicator.

61. The article of manufacture of claim 60, wherein the obtain logic comprises:
    determine logic to determine an identifier of a head of the lock-free queue; and
    retrieve logic to retrieve from the head identified by the identifier the indicator of the slot.

62. The article of manufacture of claim 60, further comprising save logic to save the slot for an outgoing message.

63. The article of manufacture of claim 62, further comprising:
    determine logic to determine whether another slot is saved; and
    return logic to return the another slot to a free slot data structure, in response to the determining indicating the another slot is saved.

* * * * *